Sept. 1, 1970 W. F. ILLMAN 3,526,085
SPLICE AND METHOD OF MAKING SAME
Original Filed May 25, 1967 5 Sheets-Sheet 1
*Fig. 1.*
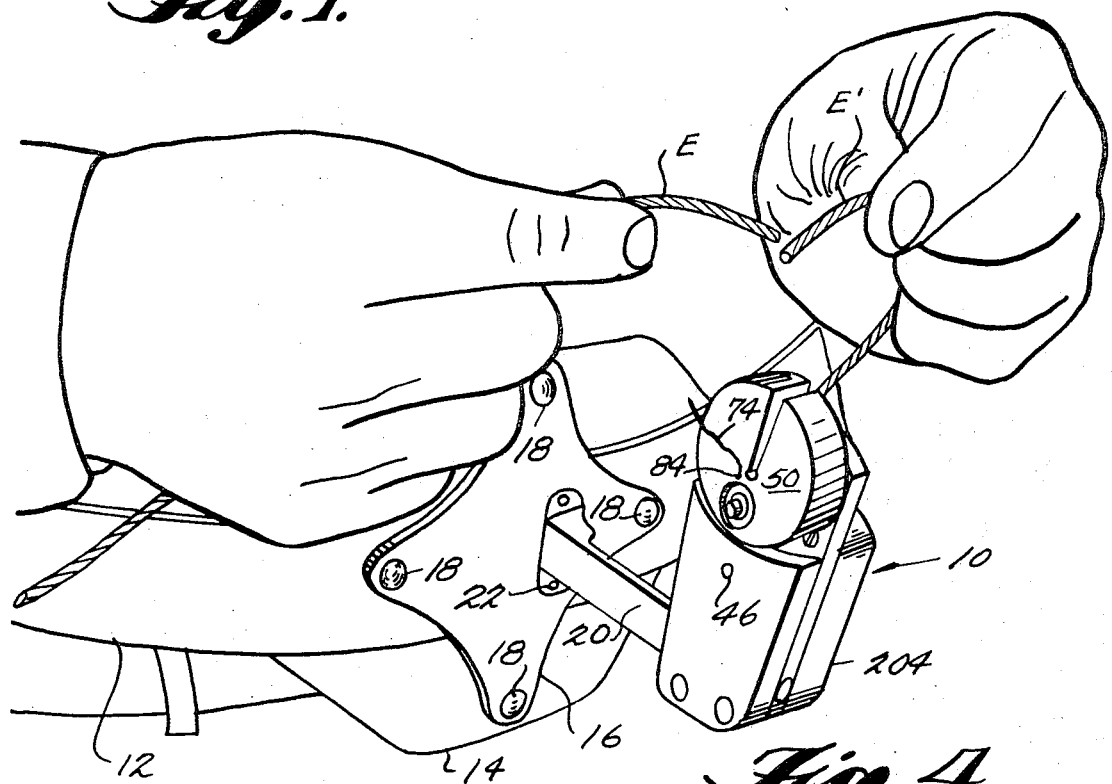
*Fig. 4.*
*Fig. 3.*
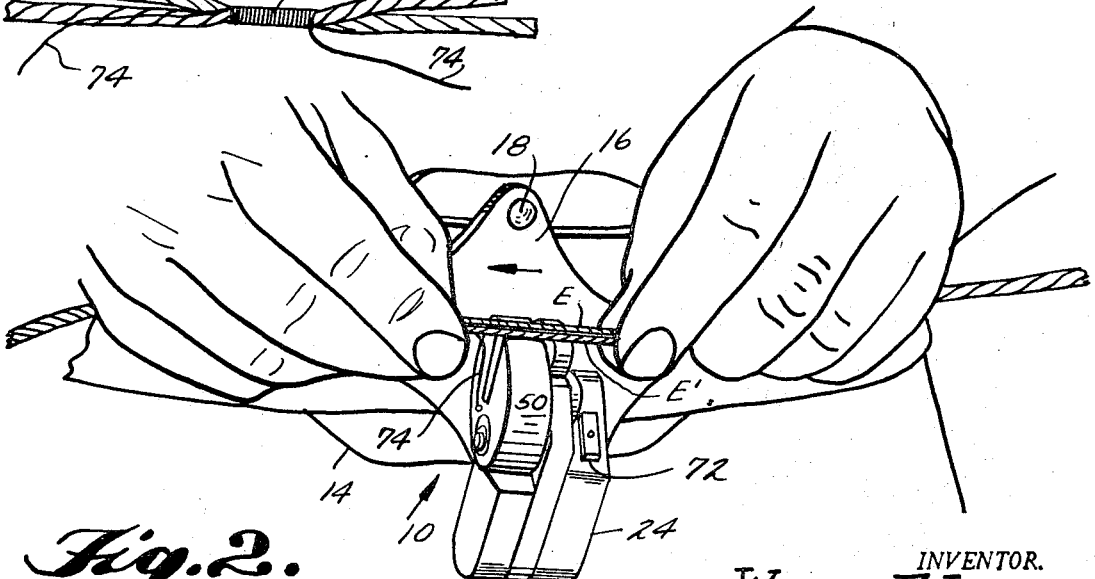
*Fig. 2.*
INVENTOR.
WALTER F. ILLMAN
BY
Cushman, Darby & Cushman
ATTORNEYS

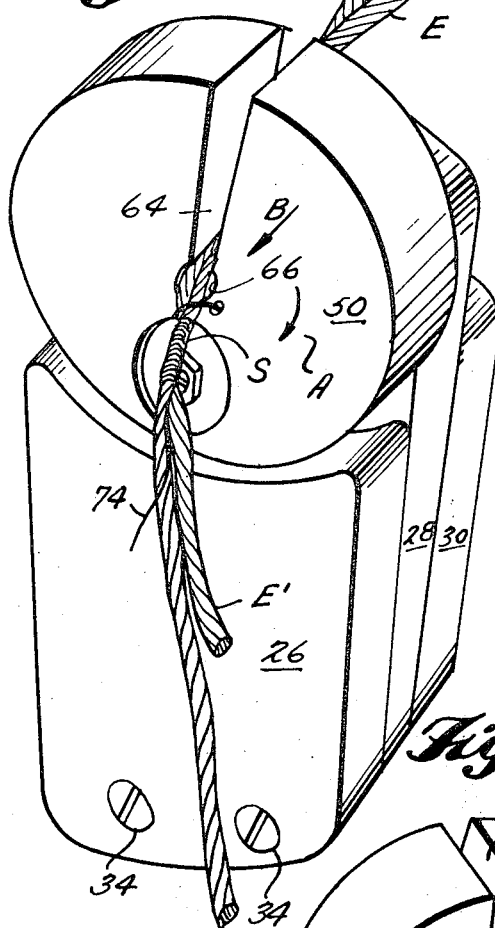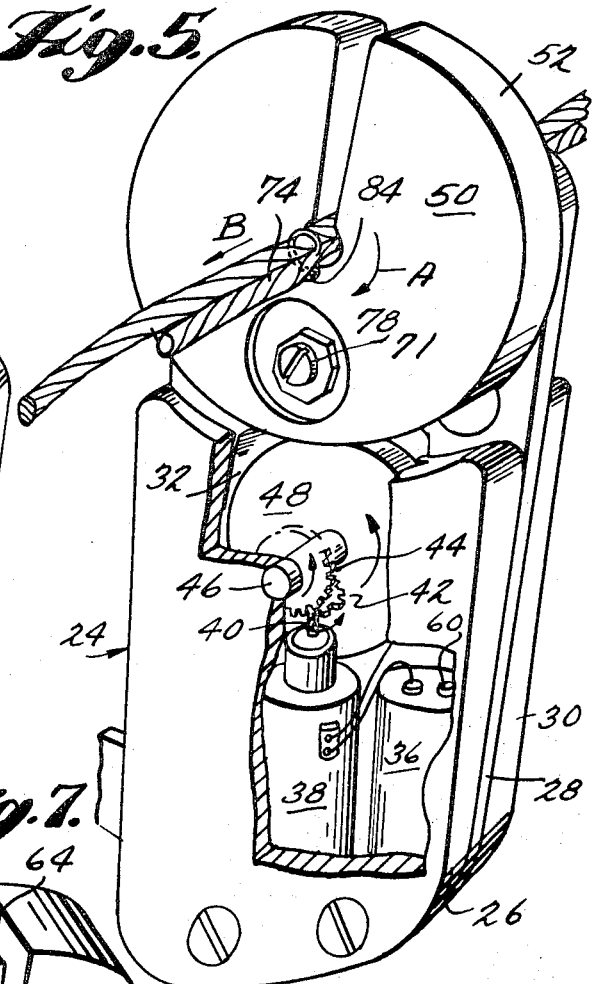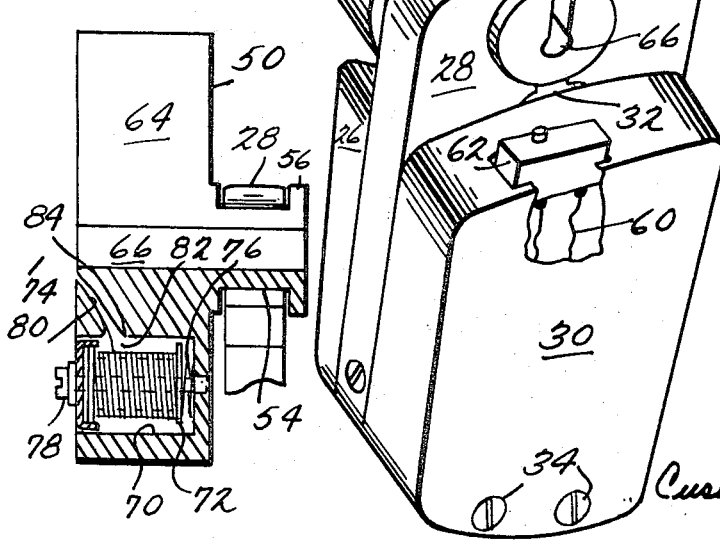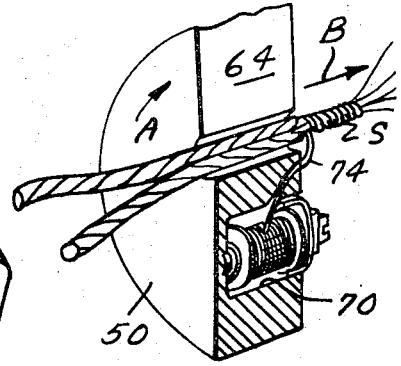

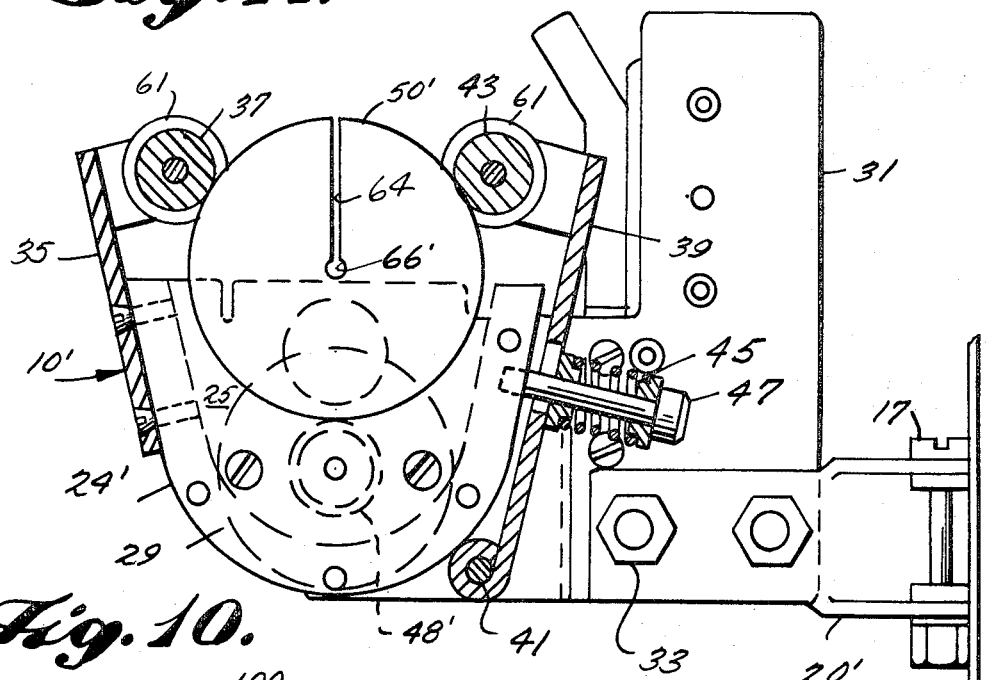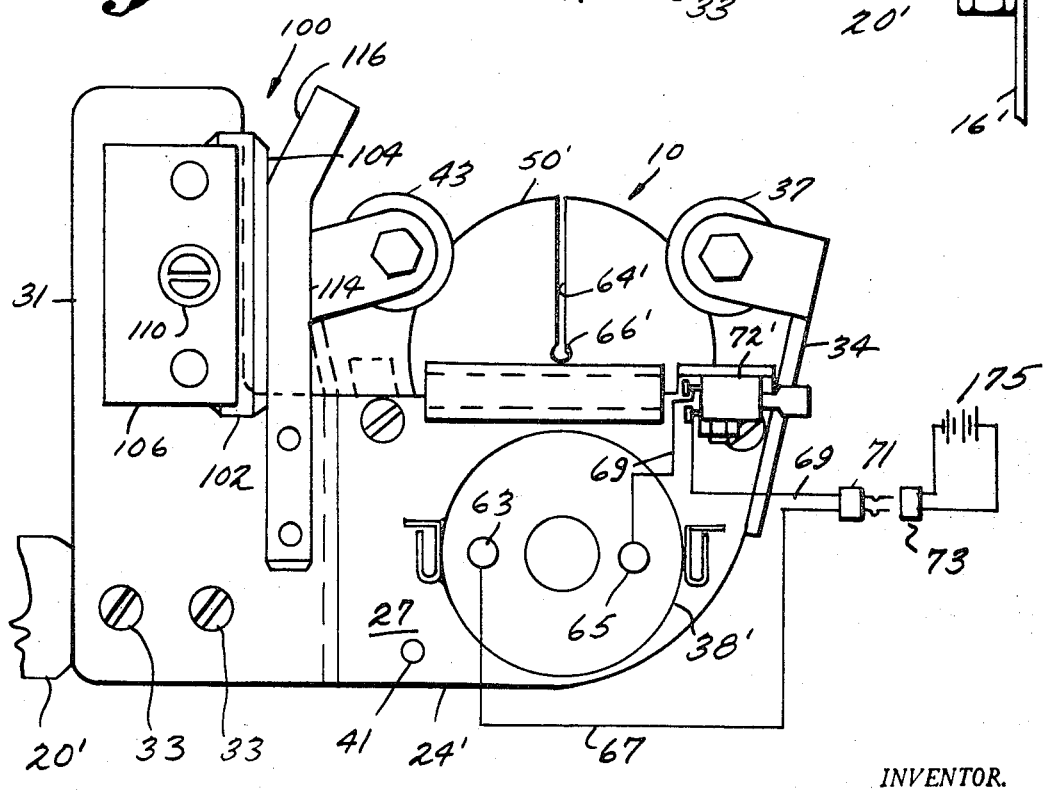

Sept. 1, 1970 W. F. ILLMAN 3,526,085
SPLICE AND METHOD OF MAKING SAME
Original Filed May 25, 1967 5 Sheets-Sheet 4
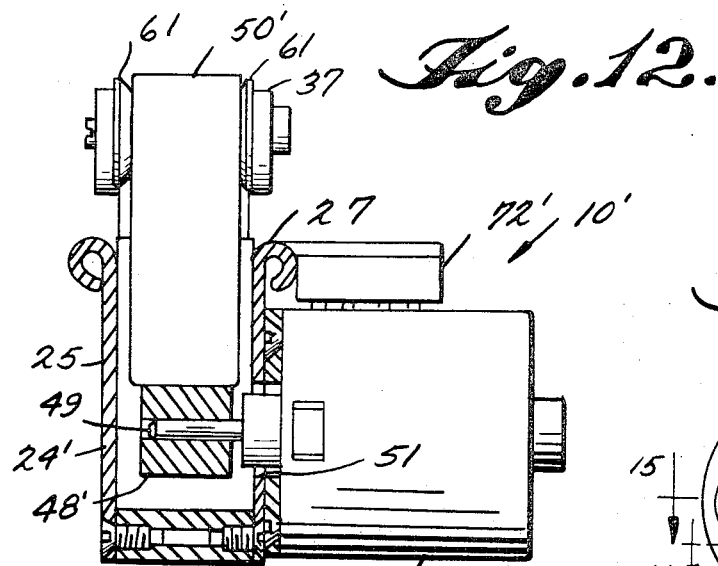
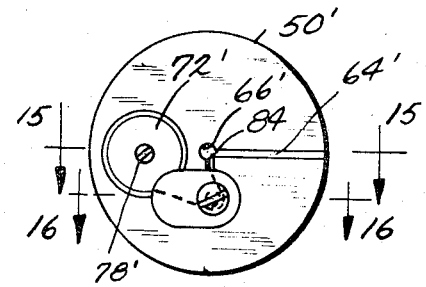
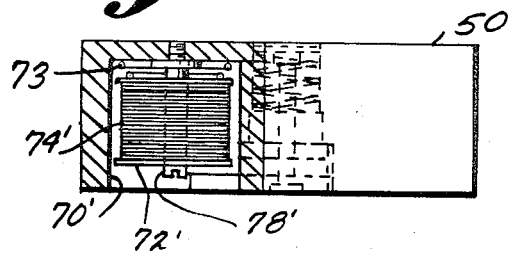
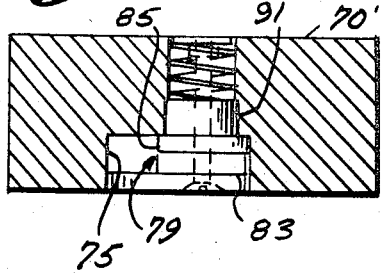
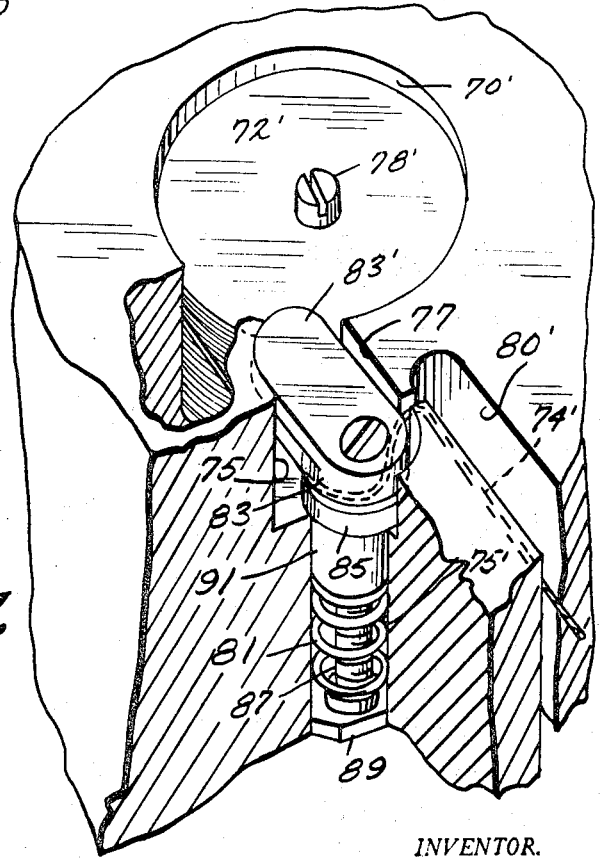
INVENTOR.
WALTER F. ILLMAN
BY
Cushman, Darby & Cushman
ATTORNEYS

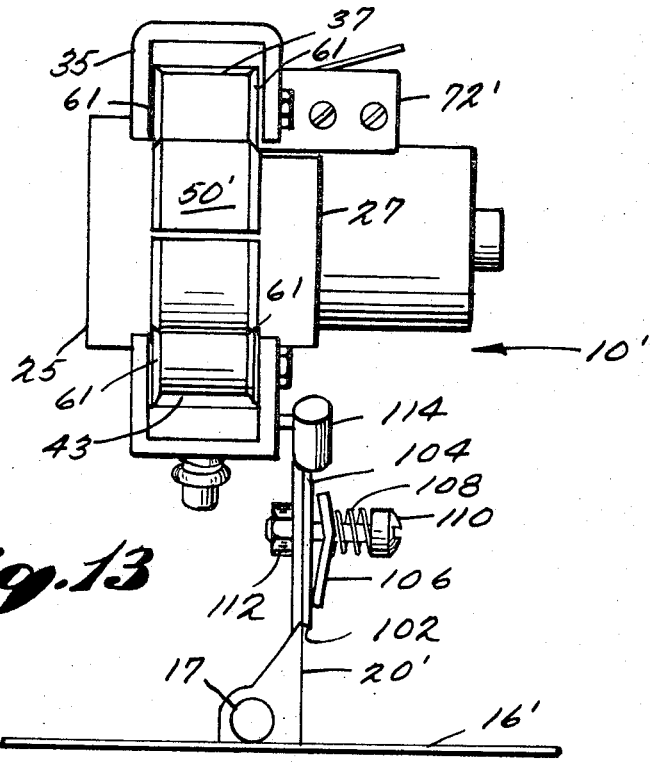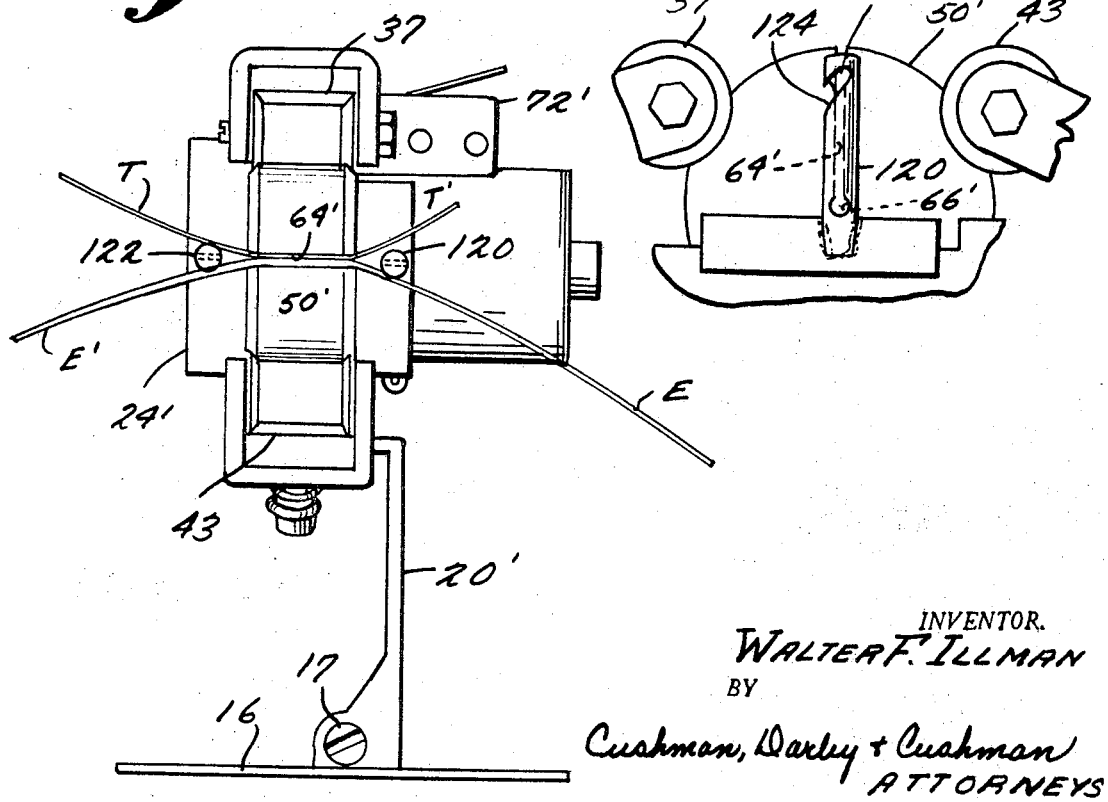

United States Patent Office 3,526,085
Patented Sept. 1, 1970

3,526,085
SPLICE AND METHOD OF MAKING SAME
Walter F. Illman, Greensboro, N.C., assignor to Burlington Industries, Inc., Greensboro, N.C., a corporation of Delaware
Original application May 25, 1967, Ser. No. 641,357. Divided and this application June 6, 1968, Ser. No. 750,664
Int. Cl. D02g 3/22; B65h 69/06, 69/04
U.S. Cl. 57—142
17 Claims

ABSTRACT OF THE DISCLOSURE

A splice and a method for making the same, the splice having flexibility and strength at least equal to the strength of the individual yarn being spliced. The yarn ends to be spliced are arranged in overlapping side-by-side relationship and a wrapping material is helically wound and embedded in the yarn ends, the wrapping material being removable after the yarn has been manipulated into a fabric. The wrapping material for the splice may be water soluble material, a solvent soluble material, or a relatively inert material and it may be multifilament or monofilament.

---

This application is a division of my copending application, Ser. No. 641,357, filed May 25, 1967, and is entitled to the filing date thereof.

The present invention relates to an improved splice for yarns and a method of making the same, the splice being easily removable after the yarns are woven into a fabric.

In the manufacturing of textiles there is a frequent need to splice together the ends of various yarns being processed. For example, if there is a break in the yarn being processed or if one supply package of yarn is exhausted and a succeeding supply package of yarn must be joined to the yarn of the first supply package, the two free ends of the yarns must be rejoined to provide continuity to the yarn. Oftentimes the processing must be stopped while the operation of joining the ends of yarn is completed and, hence, any such joining must be accomplished quickly and with a minium of delay.

Heretofore, the joining of yarns was often accomplished by tying a knot in the free ends of the yarns to be spliced, the knot either being tied by hand or by use of some suitable mechanical equipment designed for the purpose. There are many occasions in the processing of yarns and the manufacturing of textiles when a knot is not desirable. For example, a knot is normally quite bulky in relation to the diameter of the yarn being tied and, thus, with its bulk and its lack of ability to properly flex, the knot will make the yarn vulnerable to being trapped and/or broken as the yarn passes through small eyelets or apertures such as normal reed spacing in the weaving operation. Additionally, knots can be quite objectionable in the finished textile produced as they provide imperfections in the surface of such fabric.

More recently splicing of the ends of yarns together has been accomplished in the manufacture of textiles by utilizing splicing compounds, the splicing compounds being applied to overlapping free ends of the yarns with the rolling of the free ends of the yarns between the fingers, the fingers having been moistened by the splicing compound. This type of splicing has its disadvantages in that first the compound is quite tacky when applied and secondly there is a time delay involved in waiting for the splicing compound to dry. Additionally, when such compound has dried, it oftentimes results in an undesirably hard joint between the yarns, thus preventing this part of the yarns from folding in limp convolutions about other yarns during and/or after weaving. Additionally, the hard dried splicing material oftentimes hangs up on small eyelets, reed dents or the like thus causing the yarn to break.

A third means of splicing yarns has developed over the recent years, this means ultilizing a wrapping thread or yarn for wrapping the two ends of yarns together. However, the apparatus which has heretofore been utilized for making this type of splice has been quite cumbersome and stationary thus limiting its adaptability of use at any location in the textile plant or it has had the disadvantage of causing the yarns to be spliced to have a migration or loss of twist at the splice. A migration or loss of twist in the yarns at the vicinity of the splice is quite undersirable as it results in a defect in the ultimate woven product or fabric.

An important object of the present invention is to provide an improved splice and method of making the same, the splice being capable of use on yarns irregardless of whether the yarns are spun from natural fibers, synthetic fibers, animal fibers or mineral fibers. Ancillary to the preceding object, it is a further object of the present invention to provide an improved splice or method of making the same, the splice being capable of use on any yarn from fine count spun and worsted yarns up to very coarse carpet yarns.

A further object of the present invention is to provide an improved splice and method of making the same, the splice having flexibility and strength with less bulk at the splice than one of the individual yarns being spliced. Ancillary to the immediately preceding object, it is a further object of the present invention to provide an improved splice and method of making the same in which parallel contiguous ends of yarn are spliced with a wrapping thread or yarn without migration or loss of twist of the yarns regardless of the number of turns in the yarns.

Still another object of the present invention is to provide a splice and a method making the same in which the wrapping thread develops a high wrapping torque even though the wrapping thread does not possess high strength properties, the resulting splice or joint being as strong or stronger than the strength of the yarns being joined. Additionally, the splice retains the flexibility to a degree similar to the flexibility of the yarns being spliced and, thus, the splice does not interfere with the fold around other yarns of the final woven fabric in which the yarn is used.

A further and still important object of the present invention is to provide a splice for joining two yarns, the splice utilizing a water soluble or solvent soluble wrapping thread whereby the splice will have the property of disappearing from the resultant woven fabric during its wet processing or finishing such as in the regular desizing stage.

These and other objects and advantages of the present invention will appear more fully in the following specification, claims and drawings in which:

FIG. 1 is a perspective view of a portable apparatus for accomplishing the present invention, the apparatus being shown worn about the waist of an operator with the operator about to insert the ends of the yarns to be spliced into the apparatus;

FIG. 2 is a further perspective view of the portable apparatus of the present invention showing the operator grasping the yarn ends between the fingers of the hand, with one hand also grasping the end of the wrapping thread;

FIG. 3 is a fragmentary view of a splice made according to the present invention on the portable apparatus prior to the clipping of the tails from the ends of yarn as well as the tail of the wrapping yarn;

FIG. 4 is a view of a completed splice according to the present invention with the tails clipped from the splice;

FIG. 5 is a perspective view of the portable apparatus, the bracket and belt being omitted, the view being broken away in part to show an alternative modification wherein a self-contained source of power is provided for rotating the drum member of the apparatus;

FIG. 6 is a view similar to FIG. 5 but illustrating the making and completion of the splice of the ends of yarns;

FIG. 7 is a perspective view of the opposite side of the portable apparatus of FIGS. 5 and 6 and disclosing the mounting of the means selectively operable by the operator for rotating the drum member;

FIG. 8 is a fragmentary partially sectional view of the drum member of the portable apparatus and illustrating the mounting of the drum in the housing member as well as the mounting of the bobbin or spool for the wrapping thread;

FIG. 9 is a fragmentary perspective of the drum partly in section and showing the mounting of the bobbin within the drum member and the forming of a splice;

FIG. 10 is a side elevational view of the presently preferred form of the apparatus for making the splice of the present invention, wherein the electric motor is driven from a power supply external to splicer itself;

FIG. 11 is a side elevational view of the apparatus of FIG. 10, the view being taken from the opposite side and having portions thereof shown in section;

FIG. 12 is an end elevation looking from the left to the right of FIG. 10, the view showing portions of the apparatus in vertical section;

FIG. 13 is a top plan view of the portable apparatus of FIG. 10;

FIG. 14 is a side elevational view of the modified drum member shown in the apparatus of FIG. 10;

FIG. 15 is a sectional view taken substantially on the line 15—15 of FIG. 14;

FIG. 16 is a further sectional view taken substantially on the line 16—16 of FIG. 14;

FIG. 17 is a fragmentary enlarged perspective view of the drum of FIG. 14 and illustrating the path of the wrapping thread from the bobbin;

FIG. 18 is a top plan view of further modification of the portable apparatus for making the splice of the present invention; and FIG. 19 is an enlarged fragmentary side elevational view of the modification of cutter means illustrated in FIG. 18.

Referring now to the drawing wherein like characters or reference numerals represent like or similar parts, the portable splicing apparatus for making the splice of the present invention is best disclosed in FIGS. 1 and 2 wherein it is shown mounted on the waist of an operator. In more detail, the portable splicing apparatus of the present invention, which is generally designated by the numeral 10, is provided with a fabric belt 12 extending about the waist of the operator, the belt 12 being provided with an enlarged reinforcing leather member 14. A base plate 16 is attached to the member 14 as well as to the belt 12 by means of rivets 18 or the like. A standard or bracket 20 rigidly secured to the base plate 16 by means of rivets 22 extends outwardly from the base plate and supports at its outer end a housing member 24 of the apparatus 10.

The housing member 24 as best shown in FIGS. 5 and 7 includes three plastic members 26, 28 and 30, the members 26 and 30 providing side walls whereas the member 28 is inverted U-shaped and provides an internal cavity chamber 32 for the housing member. The members 26, 28 and 30 are held together as a unit by means of screws 34 or the like.

Within the cavity 32 of the housing member 24 there is mounted a battery 36 and an electric motor 38. In more detail, the electric motor 38 is provided with a drive shaft 40 having a gear wheel 42 mounted on its upper end. The gear wheel 42 meshes with a beveled gear 44 mounted on a pinion shaft 46 extending through and rotatably supported in the side wall element 26. Also mounted on the pinion shaft 46 is a rubber friction wheel 48, the friction wheel extending outwardly of the housing 24.

A drum member 50 having a periphery 52 is rotatably supported in the intermediate element 28. As best shown in FIGS. 7 and 8 the drum member 50 is provided with an axially extending sleeve 54 having a flanged end 56, the sleeve 54 fitting between the upper ends of the legs of the inverted U-shaped element 28.

Referring back to FIG. 5, it will be noted that a suitable wiring circuit 60 is provided between the battery 36 and the electric motor 38. The circuit 60 includes a microswitch 62 carried by the side wall 30 at the upper end thereof, the microswitch 62 being readily accessible to the hands of the operator when forming a splice.

The drum member 50 is provided with a radially extending slot 64, the slot 64 also extending through the sleeve 54 and flange 56. An enlarged axially extending passageway 66 is provided in the drum member 50 and communicates with the slot 64 at the slot's inner end.

As best shown in FIGS. 8 and 9, the drum member 50 is provided adjacent its periphery in its side with a cavity or chamber 70. A bobbin or spool 72, having a supply of wrapping thread 74 thereon, is rotatably supported in the cavity 70 on an axis parallel to but radially spaced from the axis of rotation of drum member 50 and its passageway 66. In order to provide an adjustable tension on the wrapping thread 74 of the bobbin 72, a spring 76 is interposed between the bobbin 72 and the bottom of the cavity 70 and a screw 78 extending through the bobbin and threadably received in the drum supports the bobbin against this spring. The tighter the screw 78 is screwed into the drum member 50, the more drag or friction is applied to the bobbin 72, thus restricting its tendency to rotate.

A passageway 80 is provided in the drum member 50, the passageway opening at 82 to the cavity 70 as well as at 84 to the exterior of the drum member. It will be noted from FIGS. 8 and 9 that the opening 84 is spaced quite close to but is radially offset from the axis of the drum member so that the wrapping thread 74 discharging from the opening will orbit about the ends of yarn to be spliced when the drum member is rotated. This tangential discharge of the wrapping thread 74 about the yarn ends coupled with the drag on the bobbin 72 results in a high torque being applied to the splice even though the wrapping thread is not particularly strong.

The wrapping thread 74 is made from a solvent soluble water soluble material such as sodium alginate, hydroxyethyl amylose, polyvinyl alcohol, and the like. By making the wrapping thread 74 of a soluble material, the splice made on the yarn ends may be dissolved out when the woven fabric or the like passes through a wet finishing operation. In other words, the wrapping thread 74 can readily be removed from the splice during any subsequent wet processing of the material woven from the yarn such as a desizing process or the like. If desired the thread 74 may be multi-filament or mono-filament in form and it may be made from an inert material.

The operation of the portable splicing apparatus 10 may be best understood by referring first to FIGS. 1 through 4 inclusive. As shown in FIG. 1 the operator takes one end E of yarn in his right hand between the thumb and index finger and another end E′ of another piece of yarn in his left hand between his thumb and index finger. The ends E and E′ are placed in parallel side by side relationship from opposing directions as shown in FIG. 2 and at the same time the operator also grabs between the thumb and index finger of his right hand the end of the wrapping thread 74 extending out of the opening 84. He then moves the two ends E and E' down into the slot 64 until the ends E and E' rest in the passageway 66 through the drum member 50. Since the switch 72 for causing the drum member 50 to rotate is closely positioned near the thumb and index finger of the left hand, the operator can press the switch and cause the drum member to rotate, for example, in the direction of the arrow A in FIGS. 5 and 6. Since ends E and E' are mounted in the passageway 66, which is coaxial with the axis of rotation of the drum member 50, the ends E and E' do not twist about one another and therefore the number of turns of the respective yarns being spliced is not mitigated or increased or decreased. With the wrapping thread 74 tightly grasped against the ends E and E' of the yarns, and with the drum member 50 rotating in the direction of the arrow A, the outlet 84 for the passageway 80 of the wrapping thread 74 orbits about the yarn ends E and E', thus delivering wrapping thread from its bobbin. The operator by moving the yarn ends E and E' simultaneously in the direction of the arrow B of FIGS. 5 and 6, will helically wind the wrapping thread 74 about the two ends E and E' of the yarns to be spliced to form the splice S. Since the wrapping thread 74 comes out of the hole or opening 84 in extremely close proximity to the axially placed parallel pair of ends E and E', a large torque is produced by the wrapping thread 74. This torque can be adjusted by adjusting the drag on the supply package or bobbin 72 of the wrapping thread 74 as heretofore explained. The torque of the wrapping thread 74 is sufficiently great so that the wrapping thread is embedded into the bulky yarns being spliced, the splice S compacting the pair of ends of the yarns to a diameter resembling one of the component yarns. By controlling the amount of movement of the yarn ends in the direction B, the operator can control the length of the splice. The strength of the splice can be increased by reciprocating the yarn ends back and forth in slot along the axis of the drum member 50 as the drum member is rotating.

Referring to FIG. 3, there is disclosed a finished splice S immediately after the yarns are removed from the drum and the wrapping thread 74 has been severed. It will be noted that the ends E and E' are provided with tails T and T' whereas there are also tails for the wrapping thread 74. The tails for the yarn and for the wrapping thread 74 may then be clipped so that finished joint or splice S will appear as shown in FIG. 4.

Referring now to FIGS. 10 through 17 inclusive, there is disclosed a modified form of the portable splicing apparatus 10'. In this particular arrangement, apparatus 10' is provided with a bracket 20' secured to a base plate 16' by means of a pivot pin 17. Base plate 16' is connected in any suitable manner to a belt (not shown) adapted to be worn by the operator. The bracket 20' is arranged to support the housing member 24' as best shown in FIGS. 11 and 12. In more detail, the housing 24' includes a pair of spaced end walls 25 and 27 separated by a U-shaped side member 29. The end wall 27 is provided with an upwardly extending flange member 31 to which the end portion of the bracket 20' is attached at the lower portion thereof by means of the bolts and nuts 33. The end walls 25 and 27, together with the U-shaped member 29, define a well or cavity therebetween in which is detachably mounted the drum member 50' as will be explained in more detail below.

U-shaped member 29 has bolted to one of its legs an arm 35, the arm being provided at its upper bifurcated end with a roller 37. A second arm 39 is pivotally connected to the flange 31 by means of a pivot 41, the second arm 39 also having a roller 43 mounted on its upper bifurcated end, the roller 43 opposing the roller 37. Arm 39 and its roller 43 are urged counterclockwise as viewed in FIG. 11 by means of a spring 45 positioned between the arm 39 and the head of a screw or bolt 47 extending through a hole in the arm and secured to the U-shaped member 29.

Referring now to FIGS. 10 and 12, it will be noted that the wall 27 has secured to outer side of the same an electric motor 38', the motor preferably being of the type disclosed in U.S. Pat. No. 2,842,692 issued July 8, 1958, to Johnson et al. The drive shaft 49 of the motor 38' extends through an opening 51 provided in the end wall 27, the drive shaft 49 having a friction wheel 48' fixedly mounted directly on the same. As will now be obvious, the drum member 50' can be snapped into and out of position in the housing 24' by pivoting the roller 43 and its arm 39 clockwise as viewed in FIG. 11. When the drum member 50' is snapped into position, its periphery will be contacted at three places, namely, by the rollers 37, 43 and the friction drive wheel 48'. Axial movement of the drum member 50' is prevented as the rollers 37 and 43 are grooved so that they are each provided with flanges 61 at their ends. Rotation of the friction wheel or roller 48' by the motor 38' causes rotation of the drum member 50'. When it is desired to replace the drum member 50' with another drum member 50', it is merely necessary to pull upwardly on the drum member and the arm 39 with its roller will pivot out of the way to permit removal and replacement.

The motor 38' which as mentioned above may be of the type shown in the aforementionde Johnson et al patent, is provided with terminals 63 and 65 to which leads 67 and 69 are connected. The leads extend to a jack plug 71. The lead 69 is provided with switch means 72' suitably supported on the housing at a position accessible to the operator's hand and this enables the operator to selectively start and stop the motor. As shown in FIG. 10, the jack 71 is arranged to be received in a receptacle 73 connected to a suitable source of electric power 75. In the modification shown in FIGS. 1 to 9 inclusive, the source of electric power is a battery carried by the housing but in the modification shown in FIGS. 10 through 17, the source of electric power 75 may be an external source such as a separate battery pack carried by the operator or located at a point of use. This source of electric power in the presently preferred form of the invention can be the power in the plant. If the power source is 110 volt AC power, then a transformer and rectifier must be used to convert this power to the lower voltage DC power required by the motor.

Referring now to FIGS. 14 through 17 inclusive, the drum member 50' is provided with a radially extending slot 64' provided with an enlarged axially extending passageway 66' for the ends of the yarn to be spliced. The drum member 50' is also provided with a cavity or chamber 70', which is offset radially from the axial passageway 66'. The cavity 70' has a post 78' carried therein for reception of a bobbin or spool 72' of wrapping thread. Between the bottom of the cavity 70' and the flange of the spool there is provided a spring 73 which normally urges the spool outwardly of the cavity.

Offset from the cavity or chamber 70' as well as from the axial yarn passageway 66', is a second chamber 75 which communicates with the chamber 70' by means of a slot or opening 77. Chamber 75 is arranged to receive a unit including a pair of tension disc members 79, the tension disc members 79 being spring urged together by means of a spring 81. In more detail the upper disc member 83 has secured thereto and extending through the lower disc member 85 a screw 87, the screw being threadedly received in a plate 89 at its lower end. The spring 81 between the plate 89 and the shoulder 91 of the lower disc member 85 urges the upper member 83 against the lower disc member. By adjusting the screw 87, the position of the plate 89 is adjusted with respect to the upper disc member 85 and thereby either increases or decreases the force between the disc members as desired to thereby adjust the tension on the wrapping thread. It will be noted that the pair of disc members 79 are a unit and are functionally held in a bore 75' frictionally by means of the collar 91.

The tension unit also functions to retain the bobbin 72' in its cavity 70'. In more detail, the upper disc member 83 is provided with a radially extending flange 83' which is arranged to be received in the slot 77. As shown in FIGS. 14 and 17, the flange 83' extends over a portion of the bobbin 72' and thus holds the bobbin on its post 78' against further upward movement by the spring 73. When it is desired to change the bobbin 72', the flange 83' and disc 83 are moved upwardly against the action of spring 81 and then pivoted out of the way of the bobbin.

A thread passageway 80' open to the side of the drum and to the chamber 75 as well as to the yarn passageway 66' is provided for leading the thread from the tension discs to the area of the passageway 66'. It will be noted that the opening of the passageway 80' to the passageway 66' at 84' (FIG. 14) is spaced quite close to but is radially offset from the axis of the drum member 50' so that the wrapping thread 74' discharged from the opening will orbit about the ends of the yarn to be spliced when the drum member is rotated. The tangential discharge of the wrapping thread 74' about the yarn ends coupled with the drag on the wrapping thread results in a high torque being applied to the splice even though the wrapping thread is not particularly strong.

As mentioned hereinbefore, after the splice S is made, the tails T and T' must be cut off close to the splice S. In the apparatus 10' shown in FIGS. 10 through 17 inclusive, cutter means 100 is provided. In more detail, a blade 102, for example, a razor having a cutting edge 104 is clamped to the flange 31 by means of a plate member 106. The plate member is spring urged against the blade 102 by means of a spring 108 between the plate member and the head of a screw 110 extending through the plate member and secured to the flange by the nut 112. A guide post 114 having its upper end flared away from the blade 102 as shown at 116 is also secured to the flange 31. The post 116 provides a guide for the tail to be cut as well as a means of protecting the hands of the operator.

Referring now to FIGS. 18 and 19, there is disclosed a still further modification of the apparatus. In this arrangement, instead of providing the cutting means to one side of the housing, a pair of posts 120 and 122 are welded or otherwise suitably secured to the housing 24' in axial alignment with the yarn passageway 64' on each side of the drum member 50'. Each post 120 and 122 is provided with an upwardly curved slot 124 on the side of the post facing away from the operator and a small cutter blade 126 is provided in the slot. In operation, the ends E and E' are crossed in an X as shown in FIG. 18 and then are placed side by side in the slot 64' and passageway 66'. The tails T' and T are held away from the operator as shown in FIG. 18 and the wrapping operation is begun by moving one side of the X splice toward one of the posts so that the yarn is wrapped slightly by the wrapping thread just sufficient to hold the splice with modest tension. The tail near the post to which the splice has been moved is then cut by the small blade 126 which is open towards the front away from the operator. The splice is then moved toward the other post and then the other tail is cut. Hence, in the normal course of making the splice, immediately after each tail is cut, the wrapping thread overwraps the ends of the yarn so as to provide a splice without free tails.

The cutter arrangement shown in FIGS. 18 and 19 is particularly adapted for use in splicing heavier yarns of the type used in making carpets from a tufting process. When a splice is made in carpet yarns, the splice must be such that it will still go through the tufting needles and, therefore, the tails must be completely eliminated.

The above-described apparatus for splicing yarns in textile plants eliminates the age-old knot burling operation since there is no fabric deformation by the bulk of the knot or its tails and since the splicing thread is unneeded after the yarn is tight within the woven fabric, the splicing thread can be dissolved out in subsequent fabric treating steps because it is water soluble. Burling, which is removing defects from a piece of cloth causes a considerable expense annually to a textile manufacturer. If a knot is not burled, a shearing machine will oftentimes cut a hole into the fabric. The present apparatus utilizing water soluble wrapping threads can completely eliminate the need to burl knots.

It will be noted that the spools or bobbins for the supply of wrapping thread contained a sufficient amount of wrapping thread so that the apparatus can be used to make about 800 splices on some yarns. Additionally, an operator can replace the spool easily from the modification shown in FIGS. 1 through 9 inclusive whereas the modifications shown in FIGS. 10 to 19 the entire drum can be replaced, the operator carrying a number of these drum members with him for use during the day. The apparatus of FIGS. 10 through 19 has a further advantage in that an operator can switch from one type of splicing yarn to another type during the course of a day's operation merely by replacing the entire drum member with a bobbin therein, should the type of yarn being spliced dictate the desirability of using a particular water soluble or nonwater soluble splicing thread.

The yarn splicing apparatus and the splice made thereby and heretofore described and illustrated in the drawing fully and effectively accomplish the advantages of the present invention. It will be realized that the foregoing specific embodiments disclosed and described illustrate the principles of the invention and are subject to some change without departing from such principles. For example, it is evident that this splicing device can be mounted on a spinning frame coner or winder, directly, or by means of a conveyor device, so that it can be moved into position where it can perform its function. For example, a relatively non-soluble wrapping material would be preferred in the case of knit goods, whereas a soluble yarn is desirable in the case of woven goods where the weave can bind in the spliced ends. Moreover, changes are contemplated in the wrapping material, which may be of the spun yarn type or may be in film, multifilament or monofilament form. Moreover, the wrapping material may be water soluble as already indicated or may be solvent soluble such as a vinyl acetate material, or may be relatively inert, such as glass which may be desired for certain aerospace uses.

What is claimed is:

1. A yarn splice having flexibility and strength at least equal to the strength of an individual yarn, said splice comprising:
    yarn ends arranged in overlapping side by side relationship;
    a wrapping material helically wound around and embedded in the yarn ends, said wrapping material being removable after the yarn has been manipulated into a fabric; and
    said splice exhibiting no free yarn ends.

2. A yarn splice as claimed in claim 1 in which said wrapping material is made from sodium alginate.

3. A yarn splice as claimed in claim 1 in which said wrapping material is made from hydroxyethyl amylose.

4. A yarn splice as claimed in claim 1 in which said wrapping material is made from polyvinyl alcohol.

5. A yarn splice as claimed in claim 1 in which said wrapping material compresses the yarn ends to an overall cross-sectional dimension through the splice no greater than the cross-sectional dimension of two adjacent free ends of the unspliced yarn.

6. A woven fabric containing at least one yarn splice according to claim 1.

7. A yarn splice as claimed in claim 1 in which the wrapping thread is a monofilament yarn.

8. A yarn splice as claimed in claim 1, in which said wrapping material is a water soluble material.

9. A yarn splice as claimed in claim 1, in which said wrapping material is a solvent soluble material.

10. A yarn splice as claimed in claim 1, in which said wrapping material is a relatively inert material.

11. A method for splicing two ends of yarn comprising the steps of:
(a) crossing the yarn ends to be spliced,
(b) wrapping the crossed yarn ends at their point of intersection with a wrapping material of relatively fine denier with respect to the denier of the material being wrapped, while moving the crossed yarns in a first axial direction,
(c) cutting one free yarn end near the wrapped portion,
(d) moving the just wrapped portion in the opposite direction while continuing wrapping to cover the cut end,
(e) cutting the other free yarn end near the wrapped portion,
(f) moving the wrapped portion at least in the first mentioned axial direction while continuing wrapping to cover the other cut end, and
(g) removing the just formed splice from the wrapping area and breaking the tail of the wrapping material.

12. The method of claim 11 wherein the wrapping material is a polyvinyl alcohol monofilament yarn, and the solvent is water.

13. The method of claim 11 wherein the wrapping material is a sodium algiñate yarn and the solvent is water.

14. The method of claim 11 wherein the wrapping material is a hydroxyethyl amylose yarn and the solvent is water.

15. The method of claim 11 wherein the wrapping material is made of a water soluble material.

16. The method of claim 11, wherein the wrapping material is made of a solvent soluble material.

17. The method of claim 11, wherein the wrapping material is made of a relatively inert material.

References Cited

UNITED STATES PATENTS

| | | | |
|---|---|---|---|
| 2,971,319 | 2/1961 | Spencer | 57—142 XR |
| 3,311,928 | 4/1967 | Werth et al. | 28—76 XR |
| 3,399,521 | 9/1968 | Thoma et al. | 28—76 XR |

STANLEY N. GILREATH, Primary Examiner

W. H. SCHROEDER, Assistant Examiner

U.S. Cl. X.R.

57—159